US008244578B2

(12) United States Patent
Stahura et al.

(10) Patent No.: US 8,244,578 B2
(45) Date of Patent: Aug. 14, 2012

(54) METHODS AND SYSTEMS TO FACILITATE KEYWORD BID ARBITRAGE WITH MULTIPLE ADVERTISEMENT PLACEMENT PROVIDERS

(75) Inventors: Paul Stahura, Sammamish, WA (US); Chris Cowherd, Redmond, WA (US)

(73) Assignee: Demand Media, Inc., Santa Monica, CA (US)

( * ) Notice: Subject to any disclaimer, the term of this patent is extended or adjusted under 35 U.S.C. 154(b) by 862 days.

(21) Appl. No.: 12/111,912

(22) Filed: Apr. 29, 2008

(65) Prior Publication Data

US 2008/0281676 A1    Nov. 13, 2008

Related U.S. Application Data

(60) Provisional application No. 60/915,018, filed on Apr. 30, 2007.

(51) Int. Cl.
*G06Q 40/00* (2006.01)
(52) U.S. Cl. .................................................. 705/14
(58) Field of Classification Search ............... 705/7, 10, 705/14
See application file for complete search history.

(56) References Cited

U.S. PATENT DOCUMENTS

| | | | |
|---|---|---|---|
| 2007/0100811 A1* | 5/2007 | Error et al. | 707/4 |
| 2007/0214132 A1* | 9/2007 | Grubb et al. | 707/5 |
| 2008/0004947 A1* | 1/2008 | Mathew et al. | 705/14 |

* cited by examiner

*Primary Examiner* — Charles Kyle
*Assistant Examiner* — Clifford Madamba
(74) *Attorney, Agent, or Firm* — Greenberg Traurig, LLP

(57) ABSTRACT

A system and method are directed towards identifying advertisement keywords within a variety of content types, identifying similarity rankings of advertisements based on the keywords, and to the guiding of keyword purchases. In one embodiment, a search is performed based in part on defined selection criteria, and/or scheduling rules. Content that may include advertisements is processed to identify advertisement keywords. A similarity ranking of different advertisements based on keywords therein may be determined. The similarity rankings may be used, with keyword pricing data, to identify instances of keyword arbitrage, guide purchase of keywords, and to control traffic flow to and from advertisements to obtain a benefit from price differentials between what one keyword seller charges for a keyword and what a click buyer will, pay for traffic directed to advertisements with the same or related keyword. In one embodiment, a three-dimensional representation is provided indicating relationships between advertisements across websites.

18 Claims, 5 Drawing Sheets

METHODS AND SYSTEMS TO FACILITATE KEYWORD BID ARBITRAGE WITH MULTIPLE ADVERTISEMENT PLACEMENT PROVIDERS

RELATED APPLICATIONS

This application claims priority to a provisional U.S. Patent Application Ser. No. 60/915,018, filed Apr. 30, 2007, the disclosure of which is hereby incorporated herein by reference.

FIELD OF THE TECHNOLOGY

At least some embodiments of the disclosure relate generally to managing electronic advertisement placement, and, more particularly, but not exclusively to identifying advertisement keywords within a variety of content types, identifying similarity rankings of advertisements based on the keywords, and to the guiding of keyword purchases.

BACKGROUND

As with traditional print and other analogue media, a lot of the content which is available on the Internet and through various digital electronic media may be supported by sponsors and advertisements. Producers of such content may obtain sponsorship directly from advertisers or from intermediate advertisement aggregators. Advertisers and content sources may enter into an agreement with the aggregator to have the aggregator serve advertisements to websites, to improve the relevance of advertisements that the content and the advertisements are related, and to track response thereto. Advertisers, for example, may pay aggregators per-click ("PPC") or pay-per-impression ("PPI") or sometimes according to other business models, like pay-per-action ("PPA"). Aggregators typically share a percentage of the advertiser revenue with the content source. Aggregators also monitor the behavior of website visitors to guide traffic flow, as well as the purchase of keywords within an advertisement. Parties have also begun to purchase keywords from aggregators with a goal of redirecting the resulting traffic to other intermediate parties who may be willing to pay more for the traffic.

While there are services available for searching well defined advertisements, there does not appear to be a mechanism for generally searching various types of content for embedded advertisements that may then also be used by various aggregators, or the like, to identify and track additional keyword usage, to guide the purchase of keywords, and/or to control traffic flow to and from advertisements and websites. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding, reference will be made to the following Detailed Description, which is to be read in association with the accompanying drawings, wherein.

DETAILED DESCRIPTION

Figure 1:
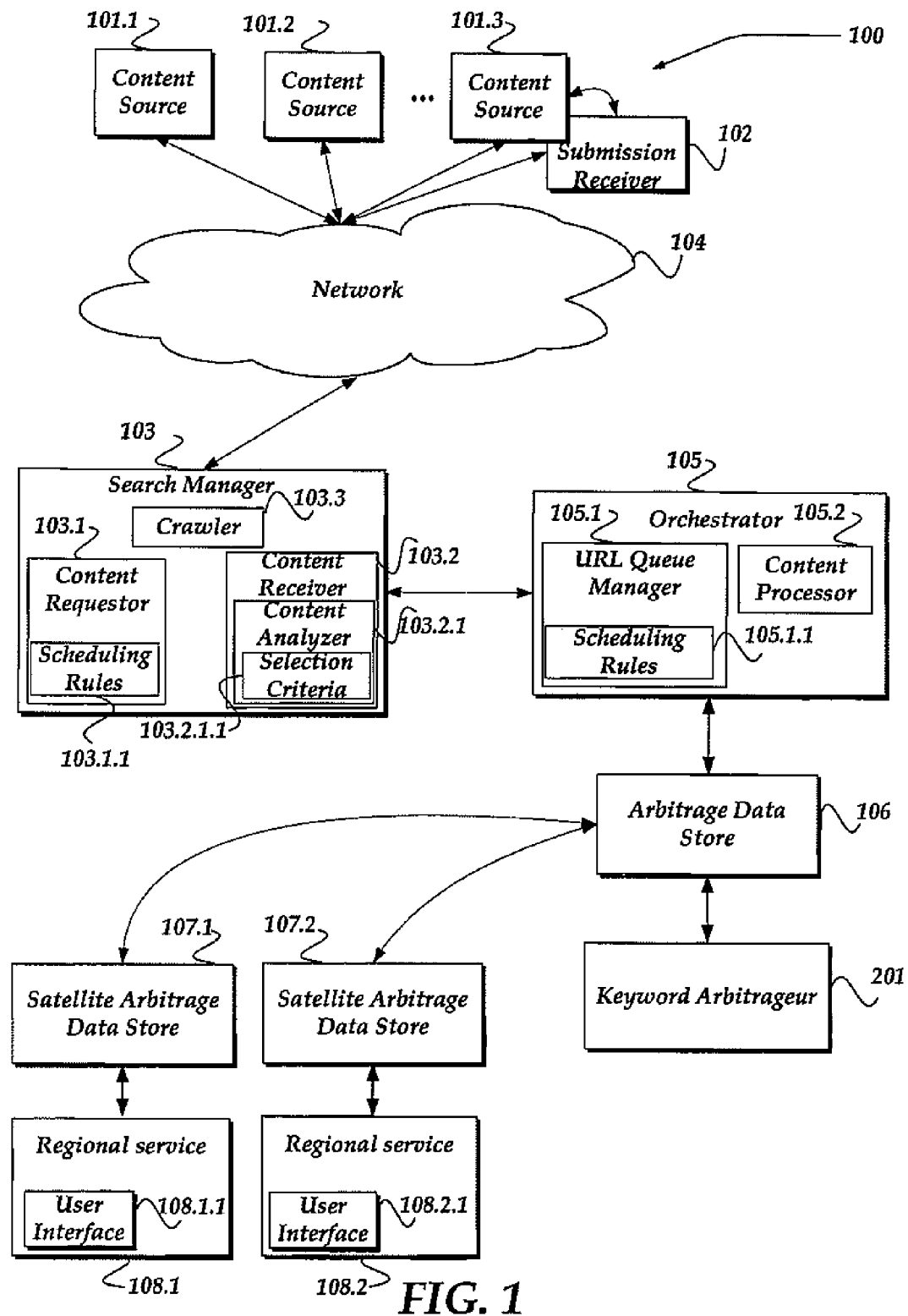
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "content" refers to virtually any form of digital electronic data, including, without limit, digital motion pictures, movies, videos, music, interactive media, audio files, still images, text, graphics, and other forms of digital data useable by a computing device. Moreover, such content is independent of a protocol in which it may be communicated, or its format. Thus, content includes, without limit, digital data available through webpages, email, RSS feeds, text messages, telephone communications, audio and/or visual communications, or the like.

As used herein, the term "keyword arbitrage" refers to purchases and/or sales of keywords with intent to profit from price discrepancies. Also, as used herein, the term "keyword" refers to any word, name, symbol, or device, or any combination thereof, which is associated with at least one advertisement.

Briefly stated the present invention is directed towards identifying advertisement keywords within a variety of content types, identifying similarity rankings of advertisements based on the keywords, and to the guiding of keyword purchases, such that a profit may be obtained from a purchase/ sell price differential. A search engine may be employed to search content for advertisements. In one embodiment, the search is performed based in part on defined selection criteria, and/or scheduling rules. Content that may include advertisements is processed to identify keywords. Keywords and/or related keywords may then be ranked, and a similarity ranking of different advertisements based on keywords therein may be determined. The similarity rankings may then be used, with keyword pricing data, to identify instances of keyword arbitrage and to guide the purchase of keywords, and to control traffic flow to and from advertisements to benefit from price differentials between what one keyword seller charges for a keyword and what a click buyer will pay for traffic directed to advertisements with the same or related keyword.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes content sources 101.1-101.3, submission receiver 102, network 104, search manager 103, orchestrator 105, arbitrage data store 106, keyword arbitrageur 201, satellite arbitrage data stores 107.1-107.2, and regional services 108.1-108.2.

Content sources 101.1-101.3 include virtually any network device that is configured to provide content over a network, such as network 104. In one embodiment, content sources 101.1-101.3 are configured to operate as website servers. However, content sources 101.1-101.3 are not limited to web servers, and may also operate a messaging server, a File Transfer Protocol (FTP) server, music server, movie server, news server, a database server, or the like. Additionally, each of s content sources 101.1-101.3 may be configured to perform a different operation. Thus, for example, content server 101.1 may be configured as a bldg website, while content server 101.2 may be configured as a music or video download server. Moreover, while content sources 101.1-101.3 may operate as other than a website, they may still be enabled to employ an HTTP communication.

In one embodiment, content sources 101.1-101.3 may obtain, and/or otherwise provide content that may include advertisements. In one embodiment, content sources 101.1-101.3 may obtain sponsorship for its services directly from advertisers and/or from an intermediate advertisement aggregator. In one embodiment, content sources 101.1-101.3 may be configured and arranged to provide access to its content through a pull mechanism, while in another embodiment, content sources 101.1-101.3 may provide its content using a push mechanism. For example, in one embodiment, content may be made available to a search program, such as a network crawler, through a Uniform Resource Identifier (URI) link, or the like. As used here, the term URI includes URLs, Uniform Resource Names (URNs), and virtually any other addressing technology for identifying a resource on a network. In one embodiment, content sources 101.1-101.3 may push its content to another network device, using, for example, RSS feeds, email, or the like. However, the invention is not constrained to such mechanisms for providing access to content, including advertisements. For example, content sources 101.1-101.3 may employ scripts, applications, applets, or similar submission receivers configured to deliver content to another network device, without departing from the scope of the invention. In one embodiment, content sources 101.1-101.3 may also employ submission receiver 102 for use in providing content over the network. Although submission receiver 102 is illustrated as being in communication with content source 101.3, the invention is not so limited. For example, each of content sources 101.1-101.3 may be in communication with submission receiver 102, without departing from the scope of the invention. In one embodiment, submission receiver 102 may be configured and arranged to operate as a web based interface, an Applications Programming Interface (API), or the like, to enable providing of content.

Devices that may operate as content sources 101.1-101.3 include personal computers desktop computers, multiprocessor systems, microprocessor-based or programmable consumer electronics, network PCs, servers, and the like.

Network 104 is configured to couple one computing device with another computing device to enable them to communication information. Network 104 is enabled to employ any form of computer readable media for communicating information from one electronic device to another. Also, network 104 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (IS-DNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 104 includes any communication method by which information may travel between one computing device and another computing device.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Search manager 103 is configured and arranged to operate as a content search and selection server. Search manager 103 includes crawler 103.3, content requestor 103.1, and content receiver 103.2. Content requester 103.1 may include local scheduling rules 103.1.1. Content receiver 103.2 may include content analyzer 103.2.1, which may in turn include selection criteria 103.2.1.1.

Devices that may operate as search manager 103 include personal computers desktop computers, multiprocessor systems, microprocessor-based or programmable consumer electronics, network PCs, servers, and the like.

Although illustrated as a single network device, however, search manager 103 is not so limited. For example, components of search manager 103 may be distributed across one or more network devices to achieve efficiencies and/or certain other objectives. In one embodiment, where the components of search manager 103 are distributed across a plurality of network devices, orchestrator 105 may be arranged to coordinate the activities of the plurality of network devices, to maximize utilization of network resources, distribute workload, or to achieve any of a variety of other objectives, including, for example, submission of a same URI from different crawlers.

Crawler 103.3 includes virtually any computer based mechanism configured to perform searches for information over a network, such as network 104. Crawler 103.3 may be configured to search for defined information, access data sources, such as content sources 101.1-101.3 for such information, store results of the search. In one embodiment, crawler 103.3 may further index its results. Although a single crawler is illustrated, a plurality of crawlers may also be employed, without departing from the scope of the invention.

In one embodiment, content requester 103.1 is configured to submit URI requests to content sources 101.1-101.3. In one embodiment, content requester 103.1 may employ a recursive URI resolver, or the like, to map URN to IP addresses, or a similar network address. Such URI to network address mapping may be provided to content receiver 103.2 and/or arbitrage data store 106 (via orchestrator 105). When content sources 101.1-101.3 receive a URI request, or similar content request, they may provide the requested content associated with the URI to the network address employed by content requester 103.1. As stated above, however, content sources 101.1-101.3 may also provide content to content receiver 103.2 without receipt of a URI request.

Submission of content by content sources 101.1-101.3 may employ, in one embodiment, a web-interface, API, or similar mechanism that is in communication with content receiver 103.2. For example, content sources 101.1-101.3 may employ submission receiver 102. In one embodiment, submission receiver 102 may allow content sources 101.1-101.3 to identify the content as including an advertisement. Submission receiver 102 may further allow content sources 101.1-101.3 to self-identify keywords in or other information regarding a submission. Submission receiver 102 may also be configured to provide content sources 101.1-101.3 with some benefit, such as monetary compensation and/or non-monetary compensation, such as placement of the advertisement in the "sponsored links" (or similar) which may be provided with the user interface 108.1.2 and 108.2.1. The submission receiver 102 may also provide that an advertisement may be submitted for free or for a fee (including through an auction). The submission receiver 102 and/or the content analyzer 103.2.1 and/or the arbitrage data store 106 may also provide keywords in an advertisement submitted for free and/or in exchange for a benefit. However, in one embodiment, such submissions may have a lower "relatedness" value than keywords which are found using another mechanism, such as through a search activity. Submission receiver 102 may also be configured to receive user feedback on the similarity of two or more advertisements or of the relatedness of keywords, including in exchange for a benefit.

It should be noted that search manager 103 is not limited to receiving content for analysis over network 104, and other mechanisms may be employed. For example, in one embodiment, one or more devices may be employed to perform optical character recognition and/or speech recognition on non-textual content. Such devices may reside between content receiver 103.2 and content analyzer 103.2.1.

Content analyzer 103.2.1 is configured to determine if received content matches any of the selection criteria within selection criteria 103.2.1.1. In one embodiment, content analyzer 103.2.1 may also be at least partially, if not entirely, located within orchestrator 105. In any event, content analyzer 103.2.1 may receive selection criteria 103.2.1.1 from orchestrator 105.

Selection criteria 103.2.1.1 may include any of a variety of factors useable to select received content for further processing. Such factors may include, for example, i) whether the source or destination URI and/or IP address of some or all of an item of content is that of a known advertiser or advertisement aggregator, ii) programming characteristics of the content (such as JavaScript, CSS, XML, or runtime-compiled or executed code known to be associated with advertisements), iii) meta-information embedded in or associated with the content which meta information may be known to be associated with advertisements, iv) characteristics of display or audio components within the content (including relative graphical arrangement and proximity of content components; presence of certain images, text, or keywords; and/or identification of two or more distinct styles within the content, including styles defined by CSS, XML, or similar), v) human identification of the content as including advertisements, vi) whether different components within the content are obtained from one or more than one content provider; vii) the presence of certain words or keywords within the content which are known to be associated with advertisements (such as "advertisement"); viii) an MD5 checksum (or similar) as applied to webpage content and/or structure (to identify changes in the content and/or structure); and without limitation ix) the presence of HTML elements, such as iframes (or similar) with sources from domain names and/or URIs different from that of the source URI.

If a match with the selection criteria 103.2.1.1 is obtained, search manager 103 may send to orchestrator 105 the selected content from content analyzer 103.2.1, which, in addition to information relating to how the content matches or does not match the selection criteria 103.2.1.1, may also include URIs. As noted above, URI to IP address mapping information may be provided to content receiver 103.2, orchestrator 105, and/or the arbitrage data store 106 if such information is not available from within the content received from content sources 101.1-101.3. In an embodiment, search manager 103 may communicate with orchestrator 105 using Simple Object Access Protocol (SOAP) protocol to exchange XML messages. Such XML messages may act as a vehicle to communicate the selected content, URIs, and/or other output of the content analyzer 103.2.1. However, the invention is not limited to SOAP and/or XML, and other protocols may be employed, without departing from the scope of the invention.

The selected content and other output of content analyzer 103.2.1 may include, for example, an image of the content received from content sources 101.1-101.3. The image need not be of the original display dimensions, but may, for example, and without limitation, be a low-resolution image (a "thumbnail") and/or an image that has been enhanced, such as by highlighting certain elements (such as advertisements), or distorted, such as to enlarge the size of certain elements (such as advertisements). The selected content and other output may also include information developed by content analyzer 103.2.1 and the content requestor 103.1. The selected content may include, for example, a date the content from content sources 101.1-101.3 was requested and/or provided, the IP address from which the content was requested and to which the content was returned, the source and/or destination URIs and/or IP addresses for various components which may comprise a website or webpage within the content, display text associated with URIs found in the content from content sources 101.1-101.3, text and URIs found in or associated with advertisements within the content, text and URIs found in or associated with areas other than advertisements within the content from content sources 101.1-101.3, an order in which advertisements are displayed, data from and/or representing results obtained from the content analyzer 103.2.1, and/or metadata. "Metadata" as used herein generally refers to descriptive information regarding an item of content. Providing metadata along with an item of content is generally optional; it is generally provided to aid in the identification, discovery, assessment, and management of the content. It may be found in HTML, XML, TIFFs, EXIFs, and other files and formats which allow extended file attributes. In any event, the selected content and other output from search manager 103, including URIs, may be sent to the orchestrator 105. In one embodiment, the information may be sent using XML.

Orchestrator 105 is configured and arranged to manage workflow to search manager 103, as well as to process received information for possible inclusion into arbitrage data store 106. As described above, orchestrator 105 includes queue manager 105.1, which is configured to manage scheduling rules 105.1.1 useable in determining if when, how, and/or how often to submit URI requests to content sources 101.1-101.3. Devices that may operate as orchestrator 105 include personal computers desktop computers, multiprocessor systems, microprocessor-based or programmable consumer electronics, network PCs, servers, and the like. Orchestrator 105 may assign work items to search manager 103. The work items may include a processed URI queue, which may be broken up into blocks and assigned to specific one or more of crawlers 103.3 and/or corresponding content requestors 103.1. In one embodiment, search manager 10, or a component therein, may send a message to orchestrator 105 to indicate that it is available for additional work items. In one embodiment, a previously assigned work item might not be assigned to another of crawlers 103.3 until a period of time has elapsed. URIs may be assigned as work items in an order determined by scheduling rules 105.1.1. In one embodiment, the scheduled work items may be represented by a processed URI queue that may then be provided to search manager 103.

Scheduling rules 105.1.1 may include, without limitation, rules to limit the frequency with which content sources 101.1-101.3 are accessed and/or the amount of data requested from a content sources 101.1-101.3 within a certain time period; rules to allow more frequent revisits with respect to new or changed items of content, rules to submit URIs from multiple IP addresses; rules to implement depth-first submission of URIs. In one embodiment, a first URI found on a given website may be submitted, followed by a first URI found on a resulting website, and so forth, until an end or a maximum depth is reached; rules to implement breadth-first submission of URIs (wherein generally all URIs found on any given website are submitted in order, before proceeding to submit URIs found on websites returned in response to the preceding URI submissions); rules to prioritize URIs based on historical information regarding whether a URI points to an IP address to which a large number of domain names or URIs point (a "large number of domain names" beginning, at the bottom end the range, with approximately five thousand domain names); rules to prioritize URIs based on historical information regarding whether the URI has been associated with a greater or lesser amount of advertising; rules to prioritize URIs based on historical information regarding the number of keywords previously found in or associated with the resulting website or webpage; rules to prioritize URIs based on historical information regarding whether specific keywords have previously been found in or associated with the resulting website or webpage; rules to submit URIs from different IP addresses rules to submit a URI until no more than approximately one new advertisement is being returned, at which time the submission rate may be reduced; and/or other rules as may be decided by a system operator, or the like.

The processed URI queue may be communicated to search manager 103 in work item units, which may also include other information, such as parameters relating to local scheduling rules 103.1.1. Such local scheduling rules 103.1.1 may include some or all of scheduling rules 105.1.1. In one embodiment, the functions of the URI queue manager 105.1 may be relocated to the search manager 103, in which case the URI queue manager 105.1 located within the orchestrator 105 might then be configured and arranged to focus on other issues, such as distribution of the URI queue, load balancing, or the like. Content processor 105.2, in orchestrator 105, may be configured to process received selected content for possible inclusion in the arbitrage data store 106. For example, content processor 105.2 may convert received selected content that is in the XML format into another format useable by arbitrage data store 106. In one embodiment, Microsoft's ActiveX Data Object (or "ADO"), ADO.net, JDBC, and/or OLEDB may be used to communicate between orchestrator 105 and arbitrage data store 106.

Arbitrage data store 106 represents virtually any network device or devices that are configured to manage storage of content useable in keyword arbitrage. As such, arbitrage data store 106 may include one or more database management servers, or the like. In one embodiment arbitrage data store 106 may represent a homogeneous distributed database (with a central database management system, such as that offered by Oracle Corporation) or a heterogeneous distributed database (such as MY-SQL), or the like. In one embodiment, arbitrage data store 106 may be configured distinct from orchestrator 105 and/or search manager 103. However, the invention is not so limited. Thus, for example, arbitrage data store 106 may also be implemented as a component within orchestrator 105, search manager 103, or the like.

In one embodiment, arbitrage data store 106 may be configured to provide content to one or more satellite databases 107.1-107.2. In one embodiment, satellite databases 107.1-107.2 may be configured as read-only data stores.

Arbitrage data store 106 may include various components configured to distribute the stored content across multiple locations within a distributed data network, to analyze the stored content, and/or develop additional information within and about the stored content. However, the invention is not so limited. For example, keyword arbitrageur 201 may also be configured to analyze the stored content and/or develop additional information about the stored content.

In any event, one or more components within arbitrage data store 106 and/or keyword arbitrageur 201 may be configured to determine information regarding frequently accessed or particularly valuable information in the arbitrage data store 106. Such information may also include, for example and without limitation, a "similarity ranking" of advertisements, determination of the number of instances in which identical advertisements within a specified similarity ranking occur in different websites and/or webpages; information regarding the number of and which websites and/or webpages an advertisement within a specified similarity ranking appear on, a length of time an advertisement and/or advertisements within a specified similarity ranking was found on websites and/or webpages; a ranking of which advertisements are found on the most number of websites and/or webpages; a ranking of advertisements according to the page rank of the websites and/or webpages on which the advertisements occur; a ranking of which advertisements are shown most often; information regarding which advertisements are displayed in response to requests from IP addresses in different geographic or other logical locations in the IP address space; information regarding changes in keyword pricing over time; a "relatedness ranking" of keywords, and other information.

A similarity ranking of advertisements may be determined by traceably indexing all keywords and traceably placing all such keywords in a table and/or graph (or in an n-dimensional space where n is a function of the number of distinct variables which are tracked in relation to keywords) to produce a rank based on the number of words in two or more advertisements which are the same or which have a "relatedness rank" above a user-defined threshold. In determining whether keywords are "the same," word stems may be employed as a substitute for and/or in addition to the keywords as found in the advertisements, synonyms, alternative tenses, and/or plural forms. In determining a similarity ranking of advertisements, additional factors may be considered, such as the advertising aggregator which provided the advertisement, the advertiser, or the like.

A relatedness ranking of keywords may be obtained by traceably placing all keywords from multiple advertisements in a table and/or graph (or in an n-dimensional space where n is a function of the number of distinct variables which are tracked in relation to keywords), and at the option of the system operator along with the words which appear in advertisements shown on the same webpage and/or website, and with additional data to represent the temporal and/or physical display proximity of the keywords. The relative rank of keyword "relatedness" can then be determined as a function of frequency of occurrence within a temporal and/or display proximity chosen by the system operator or specified by a system user. A baseline for a high relatedness rank might, for example, be different keywords which always (or very nearly always) appear in different advertisements which are displayed on the same webpage. The relatedness rank may also be affected by relatedness through other advertisements; i.e. keywords in two different advertisements A and B are seldom found together so might otherwise have a low relatedness rank, but at least two keywords in advertisements A and B both have a very high relatedness rank to at least one other keyword in advertisement C and may thus have a fairly high relatedness rank. The relatedness rank of keywords might be determined by reference to other keywords, but may also be determined with additional reference to the non-keyword words on a website and/or webpage.

As the arbitrage data store 106 may include information on the amount paid to purchase a keyword from a keyword seller as well as the display order of advertisements (which may be related to the amount paid by the keyword purchaser), the relatedness rank of keywords can also be increased, at least in part, in proportion to the amount paid to place the keyword. For example, if the keywords "asbestos" and "personal injury" are both found on an equal number of websites which include an equal number of instances of the keyword "law," then the relatedness rank of "asbestos" and "law" may be higher than the relatedness rank of "personal injury" and "law."

As noted above, the arbitrage data store 106 may also be provided with satellite (regional) data stores 107.1-107.2, which may accessed through user interfaces 108.1.1-108.2.1, which may be accessed and controlled to varying degrees by users of regional services 108.1-108.2. User interfaces 108.1.1-108.2.1 may be configured, for example, to provide a simulated 3-dimensional graphical representation of websites and webpages based on page rank (where, for example, each page is represented by a node, and each link being a line connecting nodes), drawn to form a roughly spherical shape with minimum external surface area. Nodes which are linked to most often may be illustrated as being located further toward the center and a similarity of advertisements may be found on such pages represented by color assignment. Such a simulated 3-dimensional graphical representation may be reorganized around other criteria, such as by grouping advertisements which have at least a specified similarity ranking or by grouping advertisements which includes a keyword and/or keywords within a specified relatedness rank. However, the invention is not so constrained to such graphical representations. For example, in one embodiment, websites and webpages may also be represented by a 2-dimensional tree graphs, a table, a list, or the like, without departing from the scope of the invention.

User interfaces 108.1.1-108.2.1 may also be configured, for example, to allow users to search different fields within a database, such as a source or destination URI field, source or destination domain name field, keyword, advertising aggregator provider, advertisement link weight (the number of advertisements which link to a website or URL), relatedness rank, similarity rank, date, number of domain names associated with an IP address used by a URL, or according to virtually any other criterion, and/or combination of criteria. The search results may present corresponding advertisements and/or websites and/or webpages, a thumbnail, and other websites and/or webpages showing the same advertisement (or showing an advertisement within a specified similarity ranking). Information may also be presented regarding an average position of an advertisement on a specific website and/or webpage or across all websites as well as how often an advertisement appears on a given webpage and/or website.

Arbitrage data store 106, satellite arbitrage data stores 107.1-107.2, and/or user interfaces 108.1.1-108.2.1, may be configured to enable a user to readily identify instances of potentially occurring keyword arbitrage. For example, when an IP address host is pointed to by a large number of domain names (such as, for example, five thousand or more) and where the websites associated with such domain names have a high link density (such as, for example, when the links point to URLs other than a URL associated with the IP address or point to URLs which are otherwise known to be provided by advertising aggregators, either directly or through URL redirection, redirection by JavaScript, or the like), then keyword arbitrage is likely when yet other advertisements associated with yet other domain names and/or yet other URLs point to these websites. Such instances may be readily identified.

Keyword arbitrageur 201 is described in more detail below in conjunction with FIG. 2. Briefly, however, keyword arbitrageur 201 may be configured and arranged to perform such similarity ranking of advertisements as described above, as well as to manage providing linked advertisements to keyword sellers, manage keyword purchases, and manage keywords arbitrage to enable a profit to be obtained from price differentials between what one keyword seller charges for a keyword and what a click buyer will pay for traffic directed to advertisements with the same or related keyword.

Figure 2:
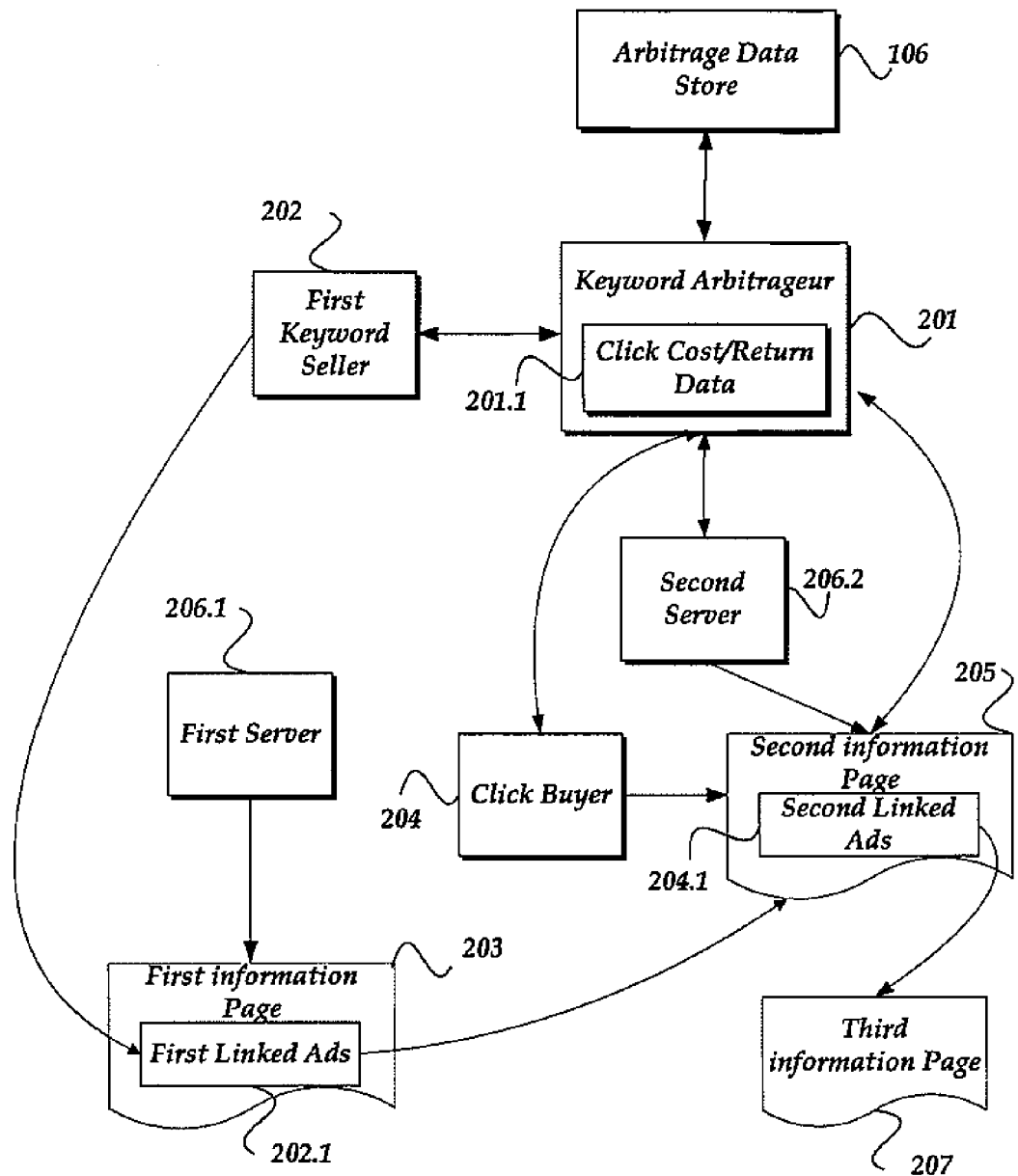
FIG. 2 is a functional diagram of one embodiment of an environment in which a keyword arbitrageur may operate.

FIG. 2 is a functional diagram of one embodiment of an environment in which keyword arbitrageur 201 may operate. Not all of the components illustrated may be required to practice the invention, and variations in the arrangement and type of the components may be made without departing from the spirit or scope of the invention. As shown, system 200 of FIG. 2 includes arbitrage data store 106, keyword arbitrageur 201, first keyword seller 202, click buyer 204, first server 206.1, and second server 206.2. Keyword arbitrageur 201 includes, in one embodiment, click cost/return data 201.1. Also illustrated are various information webpages, including first information page 203, second information page 205, and third information page 207. As shown, first information page 203 may include first linked advertisements 202.1, and second information page 205 may include second linked advertisements 204.1. It should be noted, however, that the invention is not constrained to only three information pages, and more or less may be employed, along with potentially, additional linked advertisements. Thus, for example, in one embodiment, there might be N information pages, where N is greater than three, without departing from the scope of the invention. Moreover, each of the N information pages may include one or more linked advertisements.

Keyword arbitrageur 201 is configured to communicate with arbitrage data store 106. Keyword arbitrageur 201 includes and/or has access to and/or control over at least a second server 206.2 (and potentially first server 206.1). First and second servers 206.1-206.2 may be configured to serve websites, webpages, or similar information pages, including at least second information page 205. The information pages 203, 205, and 207 may be accessed via a URI including a domain name corresponding to or including a keyword and may include content including at least one keyword.

Keyword arbitrageur 201 may also include and/or have access to and/or control over an advertisement server (potentially provided by the second server 206.2, or another server, not shown) or another system to provide first linked advertisements 202.1 to keyword sellers, including at least first keyword seller 202. Linked advertisements 202.1 may be dynamically obtained by first server 206.1 and presented on a first information page 203. In one embodiment, first server 206.1 and first information page 203 may be controlled by a same party who controls keyword arbitrageur 201; however, the invention is not constrained to such arrangement. For example, in one embodiment, first server 206.1 and first information page 203 might be controlled by a third party who has a contract with first keyword seller 202, such as where first keyword seller 202 is acting as a click buyer with respect to the third party.

As discussed above, advertisement aggregators may act as keyword sellers with respect to a first party, selling the right to serve advertisements in response to searches and/or on websites which include certain keywords. They may also act as a click buyer with respect to the first party or, more commonly, a second party, who hosts advertisements provided by the aggregator/click buyer.

First linked advertisements 202.1 may be provided directly to first information page 203 and/or to first server 206.1, instead of being passed through first keyword seller 202. First linked advertisements 202.1 may include hyperlinks to information pages, including to at least a second information page 205. Using the DNS (and/or the domain name settings used by URLs in the linked advertisements) and/or the links provided in first linked advertisements 202.1, keyword arbitrageur 201 may change and/or update a link destination of first linked advertisements 202.1.

Keyword arbitrageur 201 may also be configured to add records to a data store, including, without limitation, records including information regarding "click cost" (historic information regarding the price to purchase a keyword from a keyword seller), "click return" (an amount received from a click buyer for a click on or another action or outcome with respect to an advertisement served to a webpage), and website and webpage traffic information obtained from server logs and/or page tag data. Page tag data may be obtained by using JavaScript or similar to what is usually associated with an invisible graphic within part of a webpage. Because a graphic may be served to a browser, it provides a measure of a browser's activity relative to a website as well as information regarding the browser. Cookies may also be used in conjunction with server logs and/or page tag data to further identify a visitor to a website. As discussed above, server log, page tag data, cookies, or the like, may be used to track a flow of visitors to websites.

In one embodiment, tracking visitor interaction with a website or a set of webpages may also be managed through a DNS mechanism. In this approach, the URIs for links on a website may be provided with at least one n level domain name (for example, <hhau3da-te.eiur-8876ds.example.tld>, where <hhau3da-te> is a fourth level domain name and <eiur-8876ds> is a third level domain name and both are n level domains attached to the second level domain name <example> within the hypothetical top level domain name <tld>), and where the at least one n level domain name is a character string which may be used in a conventional lookup table to provide domain name to IP address mapping information, but which may be unique to the particular instance of a link on a webpage or which may be unique to another object of interest which is desired to be tracked, such as a webpage or website, or to an item of information which it is desirable to pass between the website servers, the user of the website(s), and the DNS. The n level domain names may be encoded according to an encryption scheme that might make it difficult for a third party to determine the association between the n level domain name and the object of interest which is desired to be tracked or the information which is to be communicated. The n level domain name may be provided by one or more servers which may serve the website to a browser, or the n level domain name may be provided dynamically by a computer operating the browser software which renders the webpage.

Resolution requests for a URI that includes such an n level domain name may be recorded by a DNS server along with additional information, such as the IP address which requested the URL resolution. The n level domain name component of the recorded resolution requests are referred to a lookup table and/or a corresponding encryption key may be utilized to decrypt information within the n level domain name. Such decrypted information may identify the particular link which included the URL, the webpage on which the link was presented, an identity of a user, session identification, date and time information, a browser instance which created the n level domain name, an amount paid to place the link on the webpage (if the link is included in a paid advertisement), an amount to be paid if the link is clicked upon, an identity or other information relating to the server which served the webpage, content of a form field associated with a "submit" button or similar, and/or such other information as may have been encoded in the n level domain name by the website servers and/or the computer which rendered the webpage. Multiple n level domain names may be provided to allow one or more DNS authorities to record such resolution requests and to process the n level domain name. Associated n level domain name links may be provided or generated for a set of webpages, allowing the link-path of a user to be tracked by the DNS. For example, a first n level domain name link may be used to link to a second webpage that includes second n level domain name links which are associated with the first n level domain name link. By resolving resolutions requests for the first n level domain name link and associated second n level domain name link(s), information regarding a user's path through the website and/or through a collection of webpages (and other information encoded into the n level domain name links) may then be made available through the DNS.

Generalized Operation

Figure 3:
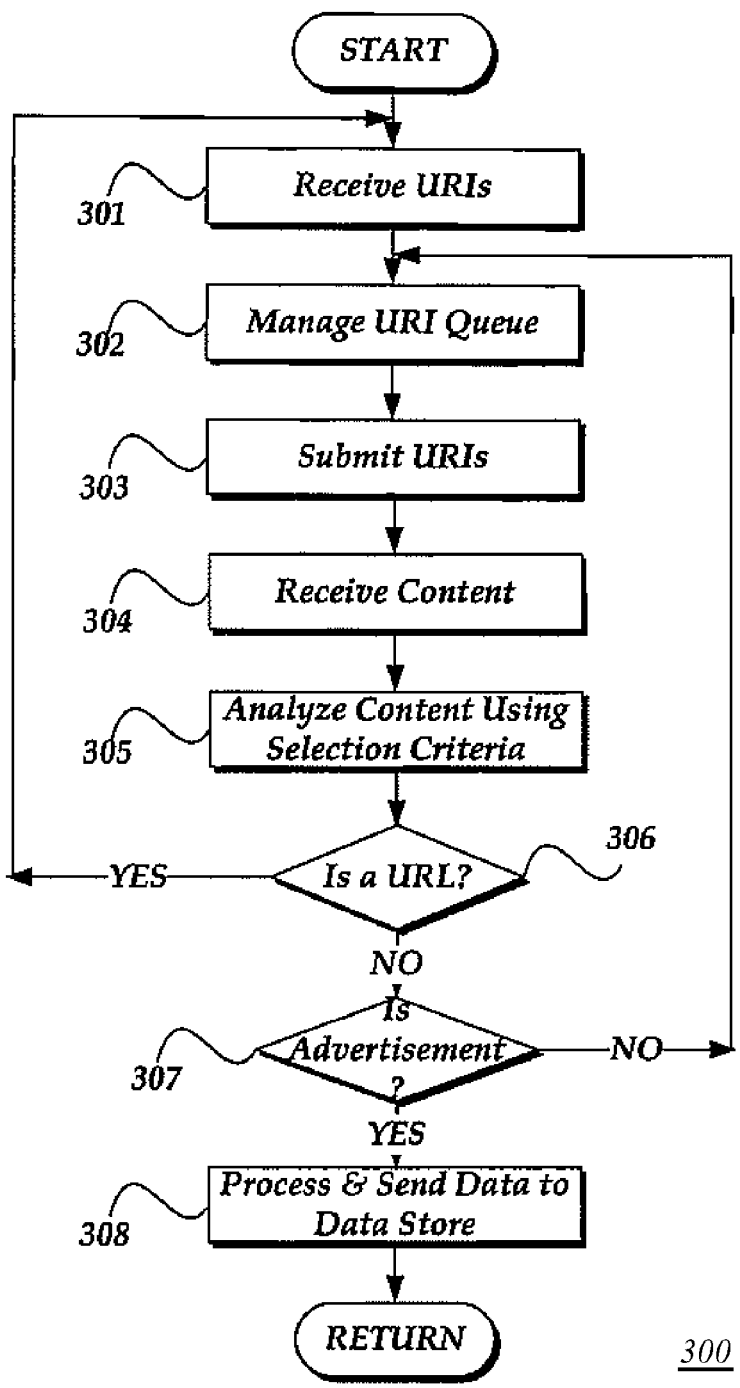
FIG. 3 illustrates a logical flow diagram generally showing one embodiment of an overview process for searching content for advertisements.

The operation of further aspects of the invention will now be described with respect to FIGS. 3-4. FIG. 3 illustrates a logical flow diagram generally showing one embodiment of an overview process for searching content for advertisements. Components of process 300 of FIG. 3 may be implemented within search manager 103 and/or orchestrator 105 of FIG. 1.

As shown, process 300 begins, after a start block, at block 301, where URIs may be received. In one embodiment, the URIs are received from a set of network addresses known to have, or likely to have, content that includes advertisements. In another embodiment, as described above, the URIs may be received based on performing a search over a network for content that may include advertisements.

Processing moves to block 302, where a queue of URIs may be managed by associating the queue with a scheduling rule, a crawler to which a queue may be directed, or the like. Processing continues to block 303, where a crawler may receive the URIs, and perform a search for content that may include at least one advertisement.

Processing continues to block 304, where based, in part, on the search, various types of content may be received. As described above, content may also be received through a variety of other mechanisms, including RSS feeds, emails, applications, and/or a variety of other push and/or pull mechanisms. For example, in one embodiment, content may be received through a submission receiver, such as described above in conjunction with FIG. 1.

Process 300 then flows to block 305, where the received content may be analyzed using one or more content selection criteria, as described above, Process 300 continues next to decision block 306, where a determination is made whether received content includes another URI, such as an embedded URI, or similar links to potentially more content that may include advertisements, keywords associated with advertisements, or the like. If so, processing loops back to block 301 to provide the other URI for further searching and evaluations. Otherwise, processing continues to decision block 307. In one embodiment, processing may also split at decision block 306, such that some content may flow to decision block 307, where the URI information may be feed back to block 301.

In any event, a decision block 307 a determination is made whether the content includes an advertisement, or information associated with an advertisement, such as advertiser information, advertisement keyword, or the like. If so, processing continues to block 308; otherwise, processing loops back to block 302. At block 308, the selected content and other information, may be provided to a data store, for subsequent processing and/or use. Process 300 may then return to perform other actions.

Figure 4:
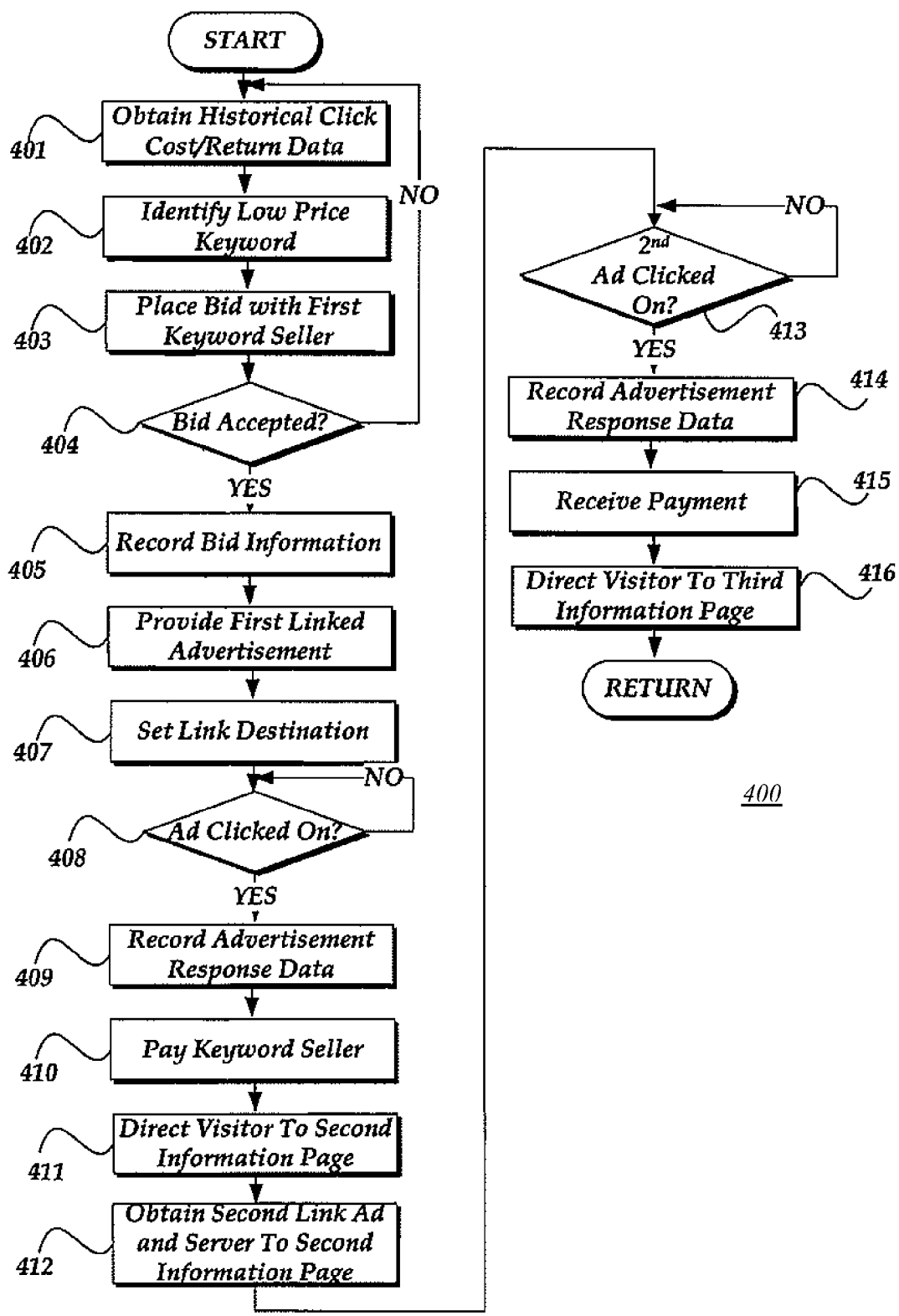
FIG. 4 illustrates a logical flow diagram generally showing one embodiment of an overview process for performing keyword arbitrage.

FIG. 4 illustrates a logical flow diagram generally showing one embodiment of an overview process for performing keyword arbitrage. Process 400 may be performed, at least in part, by keyword arbitrageur 201 of FIGS. 1-2.

Process 400 begins, after a start block, at block 401, where historical click cost and/or click return data is obtained. Processing moves to block 402, where historical data may be identified for instances in which a price for a keyword, such as keyword A, from a first keyword seller is less, by a defined amount, than a return obtained from a click buyer. In one embodiment, the click buyer may be the same as the keyword seller. In one embodiment, the historical data is for instances in which the price is based, in part, on clicks, or other selection mechanisms, on an advertisement associated with the keyword A.

Process 400 flows next to block 403 where a bid amount to purchase keyword A is determined and a bid is placed on keyword A. Continuing to decision block 404, a determination is made whether the bid is accepted. If not, processing may loop back to block 401 to obtain historical data on another keyword, advertisement, or the like.

If the bid is successful, processing flows to block 405, where bid information, including, for example, bid amount, payment metrics, time, keyword seller information, or the like, is recorded. Processing continues next to block 406, where a first linked advertisement is provided to the first keyword seller, if not already provided. Continuing to block 407, a link destination of the linked advertisement may be provided. In one embodiment, such link destination information may be provided through modification of a DNS (Domain Name System) setting for a URI that the link advertisement may employ.

Typically, for many advertisement aggregators, the purchase of keyword A may result in display of the linked advertisement in a "sponsored links" (or similar) section of search results and the display of the linked advertisement on websites which include keyword A or which are associated with keyword. Such association may be accomplished by the advertisement aggregator and/or the website operator. Display in either context is illustrated in FIG. 2 as display on the first information page 203 of first linked advertisements 202.1.

Process 400 continues to decision block 408, where a determination is made whether a visitor to the website that includes the linked advertisement, selects or clicks on the linked advertisement. In one embodiment, the determination may be based on defined click criteria, such as whether the linked advertisement is clicked on or selected a percentage of time. If the linked advertisement is not selected based on a defined click criteria, process 400 may loop back to continue monitoring for satisfaction of the criteria. In one embodiment, if after a defined time period where the click criteria is not satisfied, a message may be provided indicating that the linked advertisement is not being clicked on.

In any event, if the click criteria are satisfied, processing flows to block 409 where resulting click information and other related advertisement response data may be recorded. In one embodiment, clicking on the linked advertisement may result in a DNS resolution of the associated URI embedded in the link and serving the associated second information page, such as illustrated in FIG. 2 as second information page 205.

The click information may include date and time of the click, the IP address, cookie information of the clicking party, keywords in the advertisement, identification of the advertisement which was clicked on, or other information as discussed above. The information may be obtained and/or provided to a data store, in one embodiment, through use of DNS, server logfiles, page tag information, or from the first keyword seller.

Processing flows next to block 410, wherein in one embodiment, payment may be allocated to the first keyword seller. In one embodiment, the payment may be paid immediately, while in another embodiment, a payment may be provided based on a defined time period.

The process flows next to block 411, where clicking on the linked advertisement and the DNS resolution of the embedded URI also results in the second server serving the second information page to the visitor. Continuing next to block 412, the second linked advertisement may be obtained from the click buyer and served to the second information page. The second linked advertisement may be provided by the operator of the keyword arbitrageur, by a third party, or the like. The second linked advertisement may be provided in response to a keyword purchase, such as a purchase of keyword A, with respect to the initial purchase of keyword A and the first linked advertisement.

Process 400 continues to decision block 413, where a determination is made whether the visitor clicks on (or otherwise selects) the second linked advertisement. If not, the process 400 may continue to loop back through decision block 413 for some time period. If after the time period, the visitor does not click on the second linked advertisement, the process 400 may return to a calling process to perform other actions.

Otherwise, if the visitor does click on the second linked advertisement, process 400 moves to block 414, where advertisement response data such as described above is obtained and recorded. The process flows next to block 415, where the click buyer may pay for the second information page. In one embodiment, the payment may be a percentage of the revenue earned by the click buyer. However, the invention is not so limited, and other payment schemes may also be employed. The payment by the click buyer may then be reported to the keyword arbitrageur, or the like, for recording and use in performing keyword arbitrage, in part, by determining whether the purchase resulted in a net gain or loss, and obtaining a benefit from such differences.

Processing may continue next to block 416, where the visitor may be sent to a third information page, such as illustrated in FIG. 2. Although process 400 is illustrated as returning after block 416, the process is not so limited. For example, as illustrated and discussed above, any of a number of additional linked advertisements may be provided within information pages. Thus, process 400 may continue to perform actions as described above to obtain additional bids, provide additional payments to keyword sellers, and/or receive payments from click buyers, without departing from the scope of the invention.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Illustrative Computing Device

Figure 5:
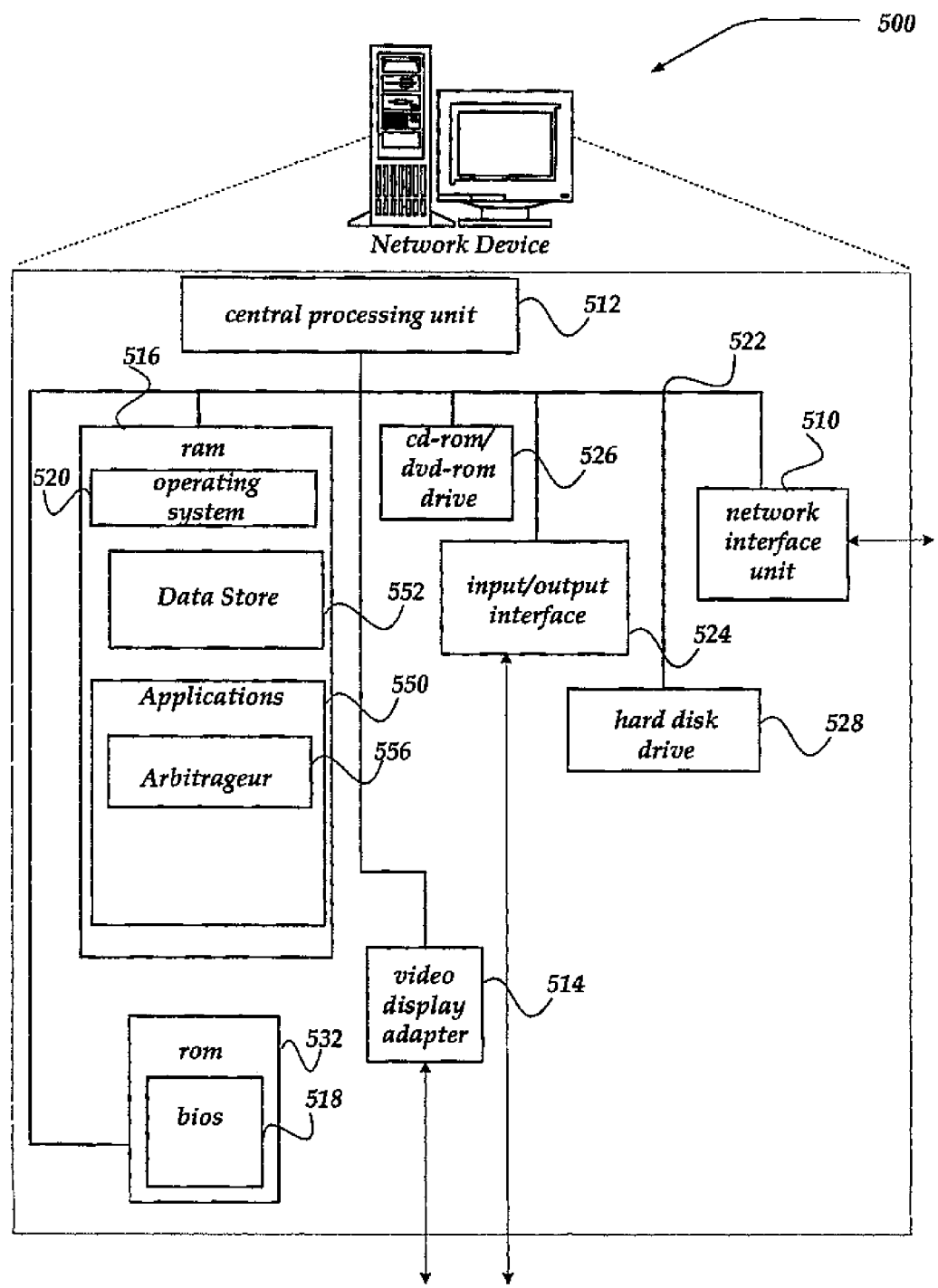
FIG. 5 shows one embodiment of a network device useable at least as a keyword arbitrageur, in accordance with the present invention.

FIG. 5 shows one embodiment of a network device, according to one embodiment of the invention. Network device 500 may include many more components than those shown. The components shown, however, are sufficient to disclose an illustrative embodiment for practicing the invention. Network device 500 may represent, for example, keyword arbitrageur 201 of FIGS. 1-2.

Network device 500 includes processing unit 512, video display adapter 514, and a mass memory, all in communication with each other via bus 522. The mass memory generally includes RAM 516, ROM 532, and one or more permanent mass storage devices, such as hard disk drive 528, tape drive, optical drive, and/or floppy disk drive. The mass memory stores operating system 520 for controlling the operation of network device 500. Any general-purpose operating system may be employed. Basic input/output system ("BIOS") 518 is also provided for controlling the low-level operation of network device 500. As illustrated in FIG. 5, network device 500 also can communicate with the Internet, or some other communications network, via network interface unit 510, which is constructed for use with various communication protocols including the TCP/IP protocol. Network interface unit 510 is sometimes known as a transceiver, transceiving device, or network interface card (NIC).

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 550 are loaded into mass memory and run on operating system 520. Examples of application programs may include transcoders, schedulers, calendars, database programs, word processing programs, HTTP programs, customizable user interface programs, IPSec applications, encryption programs, security programs, VPN programs, SMS message servers, IM message servers, email servers, account management, web servers, and so forth. Mass memory may also include data store 552 and arbitrageur 556.

Data store 552 may represent a database, application, script, folder, or the like, that is configured to manage any of a variety of arbitrage related data, including, but not limited to click cost/return data, advertisement information, URI information, keywords, similarity ranking data, or the like.

Keyword arbitrageur for which arbitrageur 556 is a component has been described above in conjunction with FIG. 1. Briefly, however, arbitrageur 556 is configured to perform such similarity ranking of advertisements as described above, as well as to manage providing linked advertisements to keyword sellers, managing keyword purchases, and managing keywords arbitrage to enable a profit to be obtained from price differentials between what one keyword seller charges for a keyword and what a click buyer will pay for traffic directed to advertisements with the same or related keyword.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system for managing advertisement placement over a network, comprising:
 a processor; and
 a tangible storage medium storing thereon program logic for execution by the processor,
 the program logic comprising:
  logic executed by the processor to retrieve, over a network, a plurality of content items from a plurality of content sources;
  logic executed by the processor to identify a plurality of advertisements embedded in the plurality of content items;
  logic executed by the processor to identify keywords of the plurality of advertisements;
  logic executed by the processor to determine similarity rankings of the plurality of advertisements based at least in part on the keywords;
  logic executed by the processor to select a keyword based at least in part on the similarity rankings, where a historical price from a keyword seller for the keyword is less, by a defined amount, than a historical price from a click buyer; and
  logic executed by the processor to purchase the keyword from the keyword seller for placement of a first linked advertisement, the first linked advertisement configured to be selected to cause the presentation of a second advertisement of the click buyer.

2. The system of claim 1, further comprising:
 an arbitrage data store configured to store advertisement related content, cost/return data, and similarity ranking data;
 wherein the program logic further comprises logic executed by the processor to provide an interface to the arbitrage data store, the interface configured and arranged to provide at least a three dimensional graphical representation of a relationship between advertisement content within or between network sites.

3. The system of claim 1, wherein the program logic further comprises logic executed by the processor to provide linked advertisements to the keyword seller.

4. A method, comprising:
 retrieving, using at least one computing device, over a network, a plurality of content items from a plurality of content sources;
 identifying, using the at least one computing device, a plurality of advertisements embedded in the plurality of content items;
 identifying, using the at least one computing device, keywords of the plurality of advertisements;
 determining, sing the at least one computing device, similarity rankings of the plurality of advertisements based at least in part on the keywords;
 selecting, using the at least one computing device, a keyword based at least in part on the similarity rankings, where a historical price from a keyword seller for the keyword is less, by a defined amount, than a historical price from a click buyer; and
 purchasing, using the at least one computing device, the keyword from the keyword seller for placement of a first linked advertisement, the first linked advertisement configured to be selected to cause the presentation of a second advertisement of the click buyer.

5. The method of claim 4, further comprising:
 presenting relationships between advertisements across websites.

6. The method of claim 5, wherein the presenting of the relationships comprises a three dimensional graphic wherein a webpage is represented as a node, and a link between two webpages is represented as a line connection nodes representing the two webpages.

7. The method of claim 6, wherein the three dimensional graphic presents similarity of advertisements via color assignment.

8. The method of claim 4, further comprising:
 determining relatedness rankings of the keywords based on the advertisements.

9. The method of claim 8, wherein the determining of the relatedness rankings comprises identifying webpages in which advertisements having the keywords are displayed.

10. The method of claim 4, further comprising:
 determining a number of advertisements within a specified similarity ranking to select the keyword.

11. The method of claim 4, further comprising:
 counting a number of advertisements within a specified similarity ranking to select the keyword.

12. The method of claim 4, further comprising:
 counting a number of websites or webpages that display advertisements within a specified similarity ranking to select the keyword.

13. The method of claim 4, further comprising:
 determining a length of time advertisements within a specified similarity ranking are displayed in one or more web pages to select the keyword.

14. The method of claim 4, further comprising:
 identifying advertisements displayed in response to requests from a group of internet protocol addresses to select the keyword.

15. The method of claim 14, wherein the group of internet protocol addresses is selected based on a geographic location.

16. The method of claim 4, further comprising:
 dynamically providing the first linked advertisement to a first server for presentation of the first advertisement in a first information page;
 paying the seller when the first linked advertisement is selected from the first information page;
 providing a second information page to present the second advertisement of the click buyer when the first linked advertisement is selected from the first information page;
 charging the click buyer when the second advertisement is selected from the second information page; and
 forwarding a visitor of the second information page to a third information page when the second advertisement is selected from the second information page.

17. The method of claim 16, further comprising:
 tracking a path of the visitor via domain name system resolution.

18. A tangible computer-readable storage medium storing thereon instructions which when executed by a computer cause the computer to perform a method comprising:
 retrieving, over a network, a plurality of content items from a plurality of content sources;
 identifying a plurality of advertisements embedded in the plurality of content items;
 identifying, using the at least one computing device, keywords of the plurality of advertisements;
 determining similarity rankings of the plurality of advertisements based at least in part on the keywords;

selecting a keyword based at least in part on the similarity rankings, where a historical price from a keyword seller for the keyword is less, by a defined amount, than a historical price from a click buyer; and purchasing the keyword from the keyword seller for placement of a first linked advertisement, the first linked advertisement configured to be selected to cause the presentation of a second advertisement of the click buyer.

\* \* \* \* \*